July 27, 1937.  S. W. SOLOMON  2,088,538
GOLF COURSE LAWN MOWER SHARPENER
Filed July 9, 1936  2 Sheets-Sheet 2
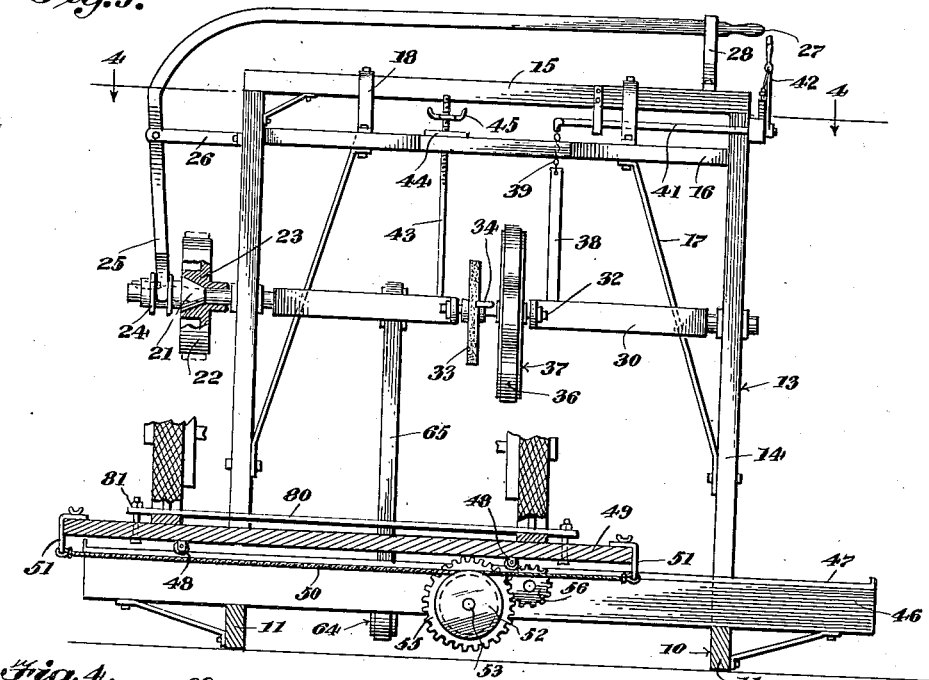
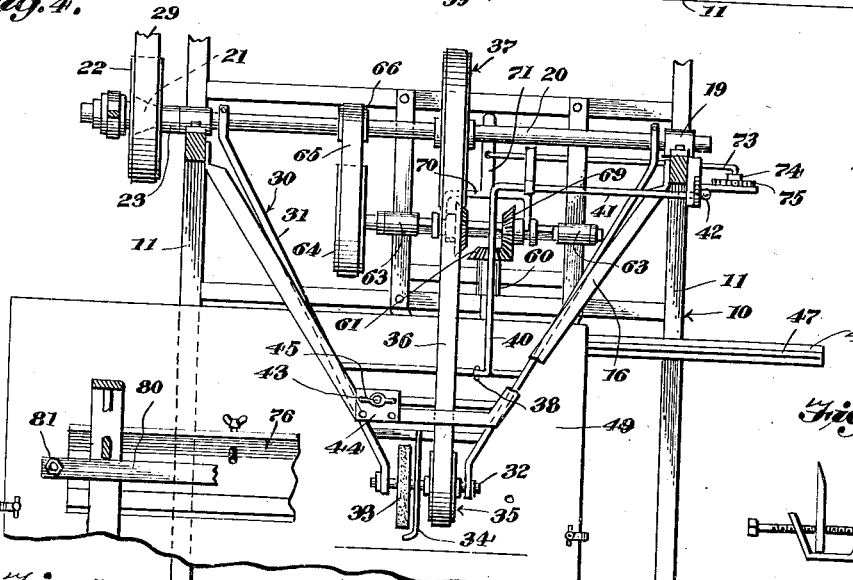
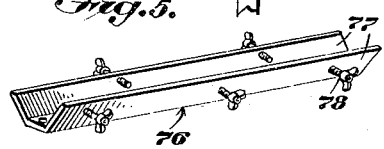
Inventor
SIMON W. SOLOMON
By *Irving L. McCathran*
Attorney Patented July 27, 1937

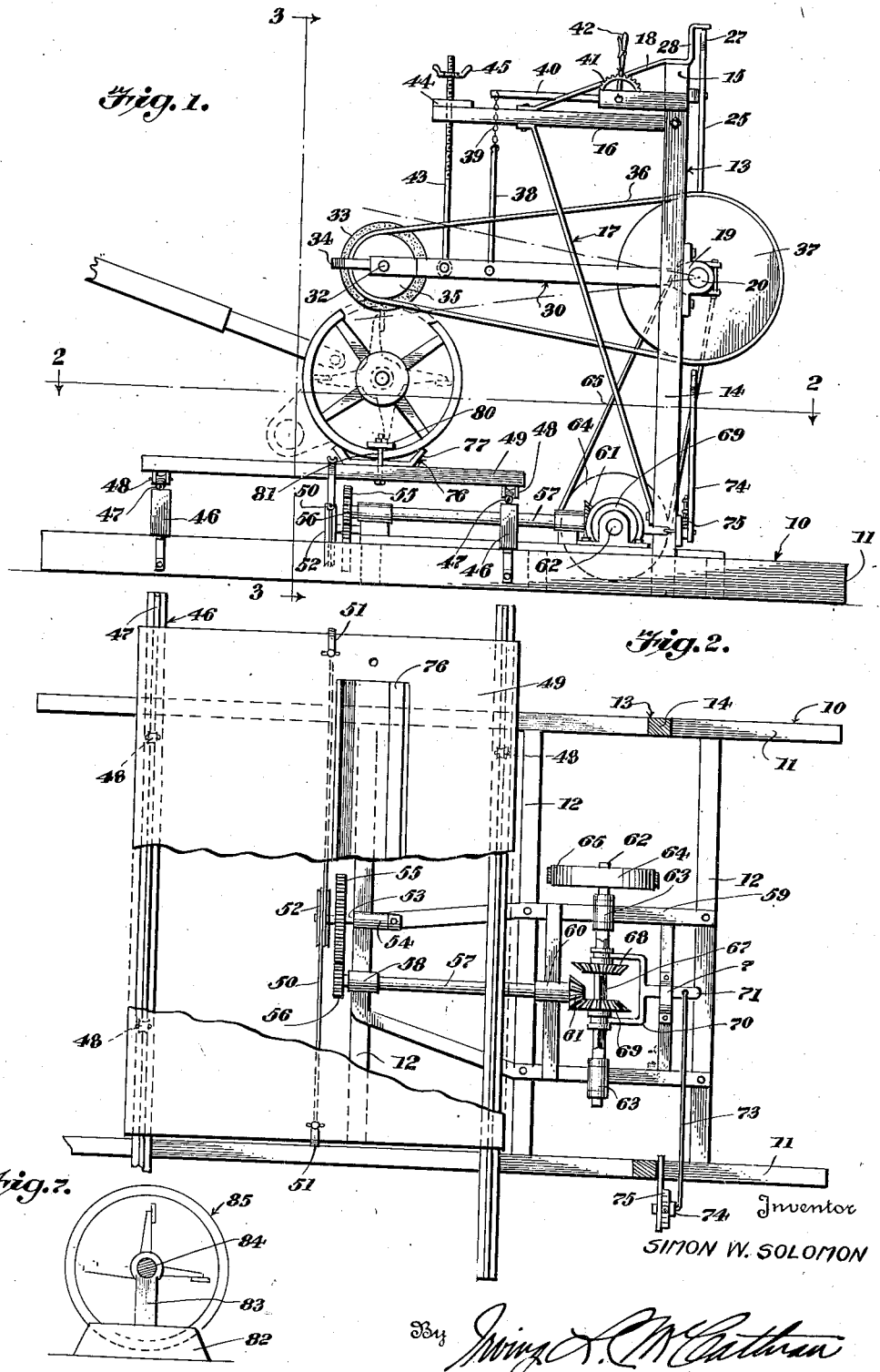

2,088,538

UNITED STATES PATENT OFFICE 2,088,538

GOLF COURSE LAWN MOWER SHARPENER

Simon W. Solomon, Lake Andes, S. Dak.

Application July 9, 1936, Serial No. 89,821

3 Claims. (Cl. 51—95)

This invention relates to lawn mower sharpeners, and has for one of its objects the production of a simple and efficient means for sharpening the mower blades of a lawn mower, and more particularly that type of mower used for mowing golf courses and the like.

A further object of the invention is the production of a mower sharpening device wherein the mower is carried by a moving table in a manner whereby the sharpening element may engage the mower blade for sharpening the same without the necessity of disassembling the mower or removing the mower blades.

Other objects and advantages of the present invention will appear throughout the following specification and claims.

In the drawings:—

Figure 1 is a side elevation of the mower sharpening device;

Figure 2 is a horizontal section taken on line 2—2 of Figure 1;

Figure 3 is a vertical section taken on line 3—3 of Figure 1;

Figure 4 is a fragmentary horizontal section taken on line 4—4 of Figure 3;

Figure 5 is a perspective view of the mower blade anchoring means;

Figure 6 is an end elevation of the clamping channel illustrating the manner of supporting the lower cutting knife when detached from the mower; and Figure 7 is an end elevation of one of the supporting jacks for a golf course mower, the shaft of the mower being shown in section.

By referring to the drawings, it will be seen that 10 designates the base which constitutes a pair of substantially parallel elongated rails 11 which rails are connected by means of transversely extending bracing beams or rails 12. The base 10 supports a vertically extending or upright frame 13, which frame 13 consists of a pair of substantially parallel uprights 14 which are connected at their upper ends through the medium of a transversely extending top beam or rail 15. The vertical rails or uprights 14 may be secured in any suitable or desired manner to the base frame such for instance as through the medium of a mortice and tenon joint. A hanger frame 16 extends at right angles to the frame 13 and is carried near the upper end thereof, this hanger frame being braced through the medium of the angle braces 17, which angle braces 17 are secured at their lower ends to the uprights 14 and at their upper ends to the under face of the hanger frame 16. The hanger frame 16 is also braced by means of the hanger braces 18 which are secured to the top rail 15 at one end and to the frame 16 at the other end.

The frame 13 carries a plurality of bearings 19 which may be of roller or ball bearing type within which bearings is mounted a driving shaft 20, the shaft 20 extending transversely of the frame 13. This driving shaft 20 carries a clutch 21 preferably of the cone type, and a pulley 22 having a clutching element 23 which is adapted to engage the clutch 21 for the purpose of rendering the shaft 20 active or inactive as the clutch 21 is shifted. The clutch 21 carries a collar 24 which is engaged by a forked arm 25, the forked arm 25 being pivotally mounted upon a bracket 26 carried by the frame 13. The arm 25 is bent to overhang the frame 13 and is provided with a handle 27 which is located preferably near the opposite side of the frame 13 with respect to the location of the pulley 22. A suitable hook bracket 28 is carried by the frame 13 adjacent the handle 27 whereby the free end of the arm 25 may be engaged under the bracket 28 to limit the upward swing of the arm 25. The clutch 21 may be moved to a disengaging position to cause the clutch engaging element 23 to disengage the clutch 21 by forcing the handle 27 downwardly, in this way cutting off the power from the shaft 20. A suitable driving belt 29 actuates the pulley 22 from a suitable line shaft or other power medium.

A grinding wheel supporting frame 30 is hung for swinging movement upon the shaft 20 and comprises a pair of supporting members 31 which converge toward each other near their outer ends and support a grinding wheel carrying shaft 32 upon which is mounted a grinding wheel 33, such as an emery wheel or a wheel of suitable character. A guard 34 is carried adjacent the wheel 33. This shaft 32 also carries a driving pulley 35 over which a driving belt 36 passes, the driving belt 36 also passing over a driving belt 37 carried by the shaft 20. This grinding wheel supporting frame 30 is journaled upon the shaft 20 at its rear end so as to allow the frame 30 to be swung upwardly or downwardly, and this frame carries a suspending bar 38 which extends vertically and is connected to a chain 39 carried by the angularly extending end 40 of the controlling lever 41, which lever 41 is provided with a handle 42, the lever 41 being journaled upon the frame 13, as illustrated. By the operation of the handle 42 it will be seen that the outer end of the frame 30 may be raised and lowered by swinging the handle 42 in the direction and to a suitable distance to suit the convenience of the operator to bring the grinding wheel 33 into and out of operation. A threaded rod 43 is pivotally connected to the frame 30 at its lower end and extends upwardly through a guiding plate 44 carried by the frame 16 and a threaded wing nut of suitable design 45, is threaded upon the upper end of the rod 43 and this nut is adjustable to limit the downward movement of the frame 30 and to limit the depth of the cut of the grinding wheel 33.

The base 10 carries a pair of transversely extending substantially parallel rail supporting beams 46 upon which are mounted rails 47 for supporting the rollers 48 of the work table 49. An actuating cable 50 is secured to the table at its ends, as at 51, and this actuating cable 50 is looped around the grooved pulley 52 mounted below the table and carried by the shaft 53 mounted within the bearing 54 which may be of roller or ball bearing type. A driving gear 55 is also carried by the shaft 53 and meshes with the pinion 56 carried by the shaft 57, which shaft 57 also passes through a bearing 58 similar to the bearing 54. A supporting frame 59 is carried by the transverse beams or rails 12 of the frame 10, and the rear end of the shaft 57 extends through a bearing 60 carried by the frame 59 similar to the bearings 54 and 58, the rear end of the shaft 57 also carrying a beveled pinion or gear 61.

A transmission shaft 62 is journaled upon the bearing 63 of the ball bearing or roller bearing type carried by the frame 59 and this shaft 62 carries a drive pulley 64 which is driven from a belt 65, which belt 65 is in turn driven by a pulley 66 carried by the shaft 20. The shaft 62 extends transversely of the frame 59 and is provided with a squared or rectangular shank 67, upon which shank are mounted the transmission beveled gears, 68 and 69, the respective gears being suitably engaged by the shifting fork 70, which fork is provided with an arm 71 passing through a bracket 72. An operating rod 73 engages the arm 71 and in turn is connected to an operating lever 74 mounted upon the frame 13, the lever being provided with a suitable dog for engaging the quadrant 75 whereby the lever may be locked in a set position. By swinging the lever 74 in the desired direction, the gears 68 and 69 may be selectively shifted into or out of mesh with the pinion 61 for regulating the direction of drive of the shaft 57 or, if desired, the gears 68 and 69 may be moved to a neutral position out of engagement with the pinion 61.

The table 49 carries a clamping member, clamp or tray 76 which rests upon its top face, for receiving the wheels of a mower, as shown in Figures 1 and 3, and this mower clamping member preferably comprises a channel member having flared flanges 77, the clamp 76 extending longitudinally of the table 49 or transversely of the frame 10. A clamping bar 80 extends longitudinally of the clamp 76 and is adapted to extend through the wheels of the mower, as shown in Figure 3. Bolts 81 engage the ends of the bar 80 and secure the same to the table 49. The mower may be tied to, or anchored in any suitable or desired manner to, the table should additional securing means be desired, without departing from the spirit of the invention. The knife reel may be swung freely to bring the mower blades into contact with the grinding wheel 33.

The clamp 76 may be used as a holder for the lower cutting knife of the mower and the lower cutting knife may be removed from the mower and placed in the clamp 76 for the purpose of sharpening. Clamping screws 78 are carried by the flanges 77 and extend into the channel of the clamp for gripping the knife of the mower in a manner as shown in Figure 6. The clamp in this manner will facilitate the handling of the lower cutting knife while sharpening, and the guard 34 is used as a rest or support when grinding the mower knife, the lower cutting knife being of course first removed from the mower while grinding.

In Figure 7, I have shown a modified type of support for a mower in the nature of a jack for fitting under the shaft of the mower reel particularly designed for supporting the multiple golf course mower. A plurality of these supports or jacks are used and an upstanding axle supporting arm 83 having a dished upper end for receiving the axle 84 of the mower 85.

The operation of the device is as follows:—

The present device has been especially designed for sharpening golf course lawn mowers, but it may be utilized for sharpening other types of mowers, or other types of devices without departing from the spirit of the invention. When sharpening mower blades, it is not necessary to dismount the same from the mower, and the mower may be placed on the table 49 such for instance, as in the manner shown in Figure 1, and the mower wheels clamped by the clamping bar 80 within the clamping member 76. The clutch arm 25 is then actuated to move the parts to a position for driving the shaft 20 and the lever 74 is actuated to cause the table 49 to move in the desired direction whereby the mower blade may be drawn transversely across the path of rotation of the grinding wheel 33, the grinding wheel 33 being dropped into position over the blade to be sharpened, in the manner shown in Figure 1 by moving the handle 42 of the lever 41, in the desired direction, and the contact can be controlled by the operator adjusting the handle 42 whereby the frame 30 will be brought into and out of engagement with the mower blade. The weight of the grinding wheel 33 and the frame 30 will cause sufficient pressure of the grinding wheel upon the blades to be ground. When the table 49 has reached its limit in one direction, the operator may shift the lever 74 in a manner as to either cut off the power by moving the gears 68 and 69 to a neutral position or reversing the direction of travel to cause the table to move in the opposite direction and draw the blade transversely across the face of the grinding wheel. This operation may be continued until the blade has been suitably sharpened and then an additional blade may be brought into proper position.

Having described the invention, what is claimed as new is:—

1. A mower sharpener of the class described comprising a base, an upright frame carried by the base, a grinding wheel supporting frame journaled upon said upright frame for vertical swinging movement, a grinding wheel carried by said grinding wheel frame, means for driving the grinding wheel, an operating lever journaled upon said upright frame and having means for engaging the grinding wheel supporting frame whereby the grinding wheel supporting frame may be elevated at the will of the operator, a threaded rod carried by the grinding wheel supporting frame, guiding means for said threaded rod supported in conjunction with said upright frame, and adjustable means carried by the threaded rod and adapted to engage said guiding means for limiting the downward movement of said grinding wheel supporting frame.

2. In a mower sharpener, a base, a carriage movable across said base, a supporting frame rising from said base, a drive shaft extending transversely across said frame and rotatably mounted, a grinder frame pivoted upon said shaft and extending horizontally from said supporting frame over said carriage, a rotary grinder carried by the grinder frame over the carriage, a hanger frame extending from said supporting frame over the grinder frame and firmly secured, a rocker shaft extending transversely of the hanger frame, an arm extending from said rocker shaft, a link connecting said arm with said grinder frame, means for turning the rocker shaft and swinging the arm to vertically adjust the grinder frame, adjustable means for limiting downward movement of the grinder frame, means for transmitting rotary motion from the drive shaft to said grinder, means for reciprocating the carriage, and means for securing a mower upon the carriage in position under the grinder whereby blades of the mower may be engaged and sharpened by the grinder during reciprocation of the carriage.

3. In a mower sharpener, a base, a carriage movable across said base, a supporting frame rising from said base, a drive shaft journaled across said frame, a grinder frame pivoted upon said shaft and extending over said carriage, means carried by said supporting frame for adjusting the grinder frame vertically and supporting the same in an adjusted position, means for limiting downward movement of the grinder frame, a rotary grinder carried by the grinder frame and rotated from the drive shaft, a trough-shaped strip extending across said carriage, means for securing wheels of a mower in the trough-shaped strip, clamps carried by side flanges of the trough-shaped strip for engaging a blade of a mower and holding a blade in position under the grinder, a driven shaft rotatably carried by said base, means actuated from said driven shaft for shifting the carriage across the base under the grinder when the driven shaft is rotated, a counter shaft rotatably carried by said base, means for transmitting rotary motion from the drive shaft to the counter shaft, and means for transmitting rotary motion from the counter shaft to the driven shaft and controlling directional rotation of the driven shaft.

SIMON W. SOLOMON.